(12) United States Patent
Morrison (10) Patent No.: US 8,197,062 B1
(45) Date of Patent: *Jun. 12, 2012

(54) VARIFICAL LENS SYSTEM FOR EYEGLASSES

(76) Inventor: Glenn Arthur Morrison, Momence, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/901,651

(22) Filed: Oct. 11, 2010

Related U.S. Application Data (63) Continuation-in-part of application No. 12/077,446, filed on Mar. 19, 2008, now Pat. No. 7,841,715.

(51) Int. Cl.
*G02B 7/06* (2006.01)

(52) U.S. Cl. ......... 351/159.48; 351/159.01; 351/159.45; 351/159.58; 351/159.6; 351/159.7; 359/741; 359/742; 359/812

(58) Field of Classification Search .............. 351/159, 351/163–166, 168–170, 172, 175, 177, 159.01, 351/159.6–159.62, 159.41–159.49, 159.57–159.59, 351/159.7–159.73; 359/741–743, 813
See application file for complete search history.

(56) References Cited

U.S. PATENT DOCUMENTS

| | | | |
|---|---|---|---|
| 2,001,952 A | 5/1935 | Birchall | |
| 2,475,275 A | 7/1949 | Birchall | |
| 2,642,776 A | 6/1953 | Boeder | |
| 3,305,294 A | 2/1967 | Alvarez | |
| 3,507,565 A | 4/1970 | Alvarez et al. | |
| 4,070,105 A | 1/1978 | Marzouk | |
| 5,644,374 A | 7/1997 | Mukaiyama et al. | |
| 7,841,715 B1 * | 11/2010 | Morrison | 351/172 |

* cited by examiner

Primary Examiner — Darryl J Collins (57) ABSTRACT

A variable focus lens system for eyeglasses is disclosed. The system consists of superimposed first and second thin lenses, simulating Alvarez lenses, with one side of each lens divided into Fresnel zones and zone boundaries. The second lens element is slidable for focus adjustment. The Fresnel zone boundary surfaces are made parallel to the user's optical line of sight to reduce visual obstructions, and the zone boundaries may be restricted to areas near the lens periphery to further reduce visual obstructions. The Fresnel zone boundaries may follow paths which enable equal, constant step size for the boundaries along their lengths. An opaque light absorbing coating may be applied to the zone boundaries to reduce light scattering. A fixed prescription lens, having the user's distance and astigmatism corrections, is superimposed on the first and second lens elements. In a second embodiment, a lens element may have at least one additional Fresnel lens component mated and bonded to it, forming a composite lens element. A composite lens element may have internal antireflection layers between the mated lenses, to further reduce internal reflections. The outer smooth sides of a lens element or composite lens element may have antireflection coating applied.

19 Claims, 5 Drawing Sheets

VARIFICAL LENS SYSTEM FOR EYEGLASSES

RELATED APPLICATIONS

This application is a Continuation In Part to application Ser. No. 12/077,446, filed Mar. 19, 2008 now U.S. Pat. No. 7,841,715.

FEDERALLY SPONSORED RESEARCH

Not Applicable

SEQUENCE LISTING OR PROGRAM

Not Applicable

FIELD OF INVENTION

The present device relates to variable focus lens systems and, more particularly, to variable focus eyeglasses.

BACKGROUND

As they age, many people require some form of correction for lack of visual accommodation or presbyopia. In view of this, there is tremendous demand for compact lightweight eyeglasses that can be easily adjusted for distant through reading focus. The basic problem is to design variable focus eyeglasses that are durable, reliable, with focus easily and rapidly adjustable, lightweight enough to be comfortable, aesthetically attractive, and reasonably priced. The eyeglasses must also be easily customized for the user's distance and astigmatism corrections.

Some of the existing types of multifocus lens for use in eyeglasses are: bifocals, trifocals and progressive lenses having either zones with differing dioptric powers, or continuously varying powers across the lens. With this type of lens, to get a full field of vision the wearer must tilt the head up and down or adjust the position of the glasses as they focus on objects at various distances. When reading, the view to either side of the reading zone is indistinct.

Another type of variable focus lens involves a fluid which is controlled to vary the shape of a flexible lens envelope. Typically this involves mechanically changing the shape of the lens by varying the amount of a transparent fluid contained between the two lens surfaces. Examples are U.S. Pat. Nos. 6,618,208 (Silver), and 6,040,947 and 5,999,328 (Kurtin, et al). In this type of lens, the fluid may leak from the envelope designed to contain it. Many such lenses suffer from poor optical quality due to the mounting arrangement for the membrane or poor choice of the fluid.

In another concept, a voltage is applied to vary the refractive index of the individual pixels of a liquid crystal lens, thus controlling the focal length of the lens as a whole. An example is U.S. Pat. No. 6,619,799 (Blum, et al). In the case of liquid crystal pixelated lenses, there are the problems of slow focus adjustment speed and variation of refractive index with temperature. A serious drawback is the projected high cost of this type of lens.

In the concept most relevant to the present device, two relatively slidable aspherical lenses are positioned to produce variable power in the simulated equivalent of a spherical lens. Examples are U.S. Pat. Nos. 3,305,294 and 3,507,565 (Alvarez), and 5,644,374 (Mukaiyama, et al.)

With slidable lenses designed up to the present time, there is a bulkiness factor due to the increase in lens thickness towards the lens periphery. The edge of the slidable lens element, being thick in some places, would likely be an objectionable obstruction to the user's vision, in addition to giving the glasses a poor appearance from the aesthetic standpoint. Even if the lenses of the system are Fresnelized as suggested by Alvarez (U.S. Pat. No. 3,305,294), he indicates conventional Fresnel lenses with abrupt changes in lens thickness, possibly leading to undesirable obstructions to the user's vision. At least one part of the edge of each Alvarez lens element has excessive thickness that leads to bulkiness and conspicuous appearance.

Despite the many examples of variable focus lenses and eyeglasses described in the prior art, to date none have achieved widespread commercial acceptance as an alternative to fixed focus lenses such as bifocals, trifocals, and progressive lenses. A major factor in market failure of the three basic types of lens system discussed above, when mounted in spectacles, has been bulky, complex design leading to a poor aesthetic effect. Additionally, the cost of most such lenses is considerably higher than traditional fixed focus lenses such as bifocals.

It is an object of the present device to provide a variable focus lens system for eyeglasses.

It is another object of the device to provide variable focus eyeglasses with minimal perceived lens obstructions and maximum clarity of view.

It is another object of the device to provide variable focus eyeglasses that are rapidly adjustable for near and far focus.

It is another object of the device to provide variable focus eyeglasses that are lightweight and unobtrusive, leading to a positive aesthetic effect.

It is another object of the device to provide variable focus eyeglasses that are inexpensive enough for mass market appeal.

SUMMARY

In accordance with the present device, there is provided a variable focus lens system that can be used in eyeglasses. In a first embodiment, the lens system consists of a stationary first lens element and a slidable second lens element superimposed on each other, arranged one behind the other along the optical axis of the lens system. The first and second lens elements are designed to simulate Alvarez lenses. The two sides of each lens element are substantially normal to the optical axis. To control the thickness of the lens elements, one of the sides of each lens element is divided into Fresnel zones and zone boundaries. The zone boundary surfaces can be made substantially parallel to the optical line of sight from the user's eye to the boundary, to reduce visual obstructions as perceived by the user. A prescription lens is superimposed on the other lens elements, having the user's distance and astigmatism corrections. One large Fresnel zone can be located in the central part of a lens element, with the remainder of the zones located near the lens periphery, to reduce visual obstructions. To reduce light scattering, an opaque coating can be applied to the zone boundaries. A finger pad can be attached to the second lens element as a means to adjust the lens element's relative position for changing the focus. Anti-reflection coating can be applied to the lens elements.

In a second embodiment, each of the first and second lens elements has at least one additional Fresnel lens component mated and bonded to it, forming a composite lens element. A composite lens element may have internal antireflection layers between the mated lenses, to further reduce internal reflections. The outer smooth sides of a composite lens element may have antireflection coating applied.

DESCRIPTION OF FIRST EMBODIMENT

The present device is a varifocal or variable focus lens system that can be used in eyeglasses, which employs two relatively slidable lenses having Fresnel zones and sloped zone boundaries, designed to minimize perceived obstructions to the visual field and to improve the aesthetic appearance of the eyeglasses.

The first embodiment of the present device, a variable focus lens system, the features of which are shown in FIGS. 1-7, builds upon the basic Alvarez concept by Fresnelizing it with the addition of a treatment of the Fresnel zone boundaries designed to make the zone boundaries less visible both to the user and others, and to improve the aesthetic appearance of the lens system when used in eyeglasses. The device may also feature restriction of Fresnel zone boundaries to areas near the lens periphery, for further reducing obstructions in the visual field of view.

FIGS. 1-7 show a first embodiment of the present device, a rear view of the left-hand side of a pair of eyeglasses which the user can easily focus from infinity through reading distance to close focus with the fingers, by moving a finger pad along the edge of a frame. The prescription for astigmatism and distance correction for each eye can be changed by replacing a fixed prescription lens. The lens periphery need not be round.

Figure 4:
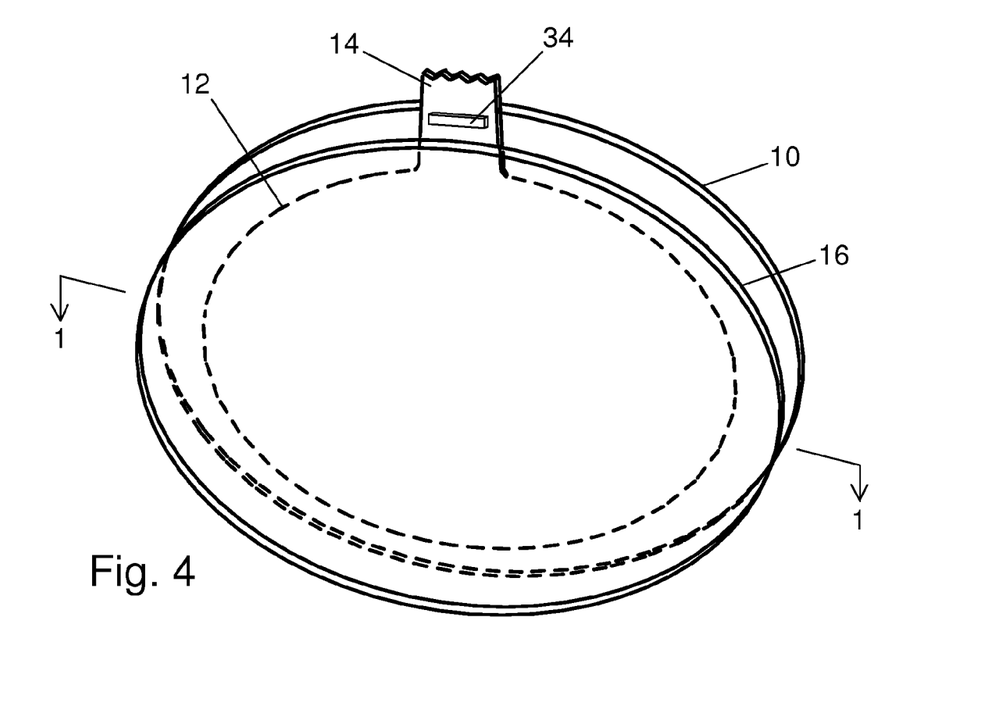
FIG. 4 is a perspective view of the embodiment, the lens spacings being exaggerated for clarity.
Figure 5:
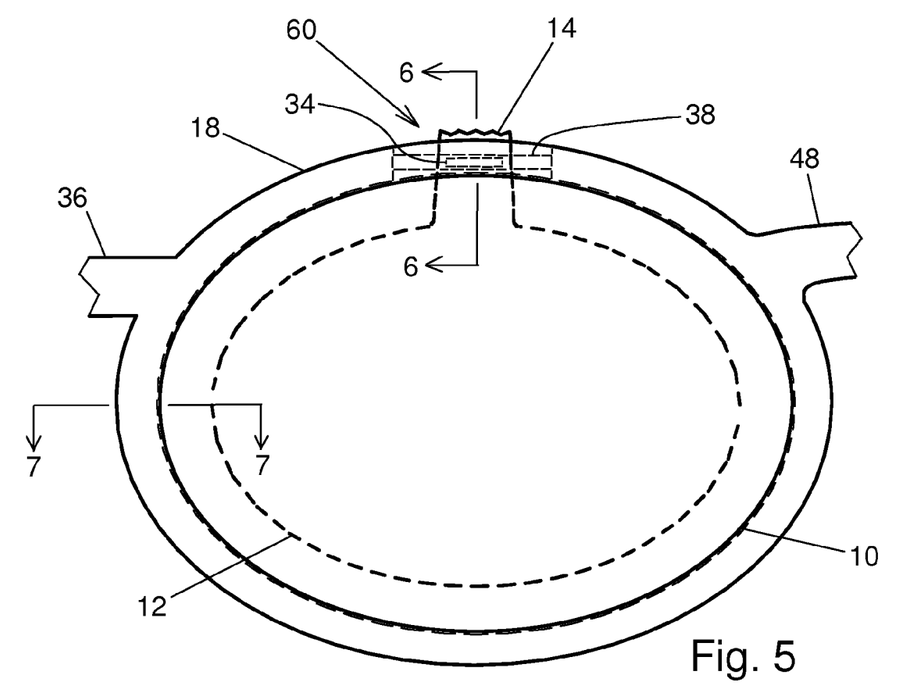
FIG. 5 is a rear view of the embodiment, the left-hand side of a pair of variable focus eyeglasses.

The device of FIGS. 4, 5 consists of an eyeglass frame 18 with bridge 48 and earpiece holder 36, on which left and right-hand variable lens systems are mounted. In FIG. 5 only the left-hand side of the eyeglasses is shown. Both left and right lens systems are assembled from the following: a first lens element 10, fixed to the frame 18, with one side divided into at least two first Fresnel zones 30 and at least one first zone boundary 28 (shown in FIGS. 1, 2), a slidable second lens element 12 with at least two second Fresnel zones 32 and at least one second zone boundary 33 on one side, with attached finger pad 14, and a fixed replaceable prescription lens 16 customized with the user's astigmatism and distance corrections. The second lens element 12 slides between the fixed first lens element 10 and the fixed prescription lens 16, changing the dioptric (focusing) power of the eyeglasses through a wide range, giving a constant dioptric power over the entire field of view of the superimposed lenses at any focus setting. All the parts can be made of plastic (e.g. polycarbonate) with the possible exception of an earpiece holder 36 and earpieces (not shown).

Figure 6:
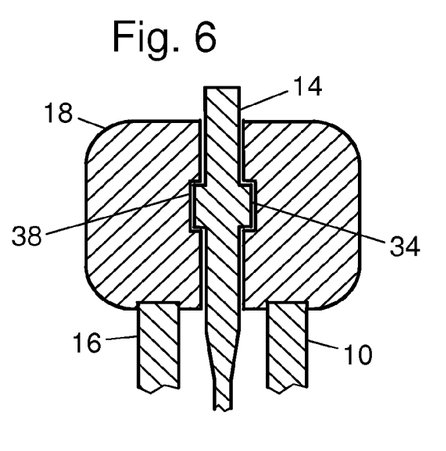
FIG. 6 is a section view of the embodiment, a frame with lenses and finger pad, taken along the plane of lines 6-6 of FIG. 5.

The frame 18 has a frame groove 38 for accommodating the finger pad 14, which is connected to the second lens element 12 (FIGS. 5, 6). The finger pad is provided with a finger pad flange 34 in such a way as to restrict the second lens movement to horizontal motion and to prevent dust from entering between the lenses. The frame groove, finger pad, frame and finger pad flange constitute a means 60 for moving the second lens elements relative to the first lens element in a direction normal to the optical axis of the lens system. The particular configuration shown is one of many equivalent devices which can serve the same purpose. The first and second lens elements and the prescription lens can be made of a strong and precision moldable material such as polycarbonate. These lenses serve as the main components of the lens system. The first lens element 10 can be about 1-2 mm thick, and may have a slight overall curvature or "dishing out", as in conventional eyeglass lenses, for improved rigidity. One side of the first lens element is divided into an array of first Fresnel zones and sloped first zone boundaries of the zones. The zonal array allows control of the thickness of any particular area of the lens, regardless of the curvature or slope of the lens side or surface at that point. One or both sides of the first lens element 10 may have antireflection coating (not shown).

Figure 3:
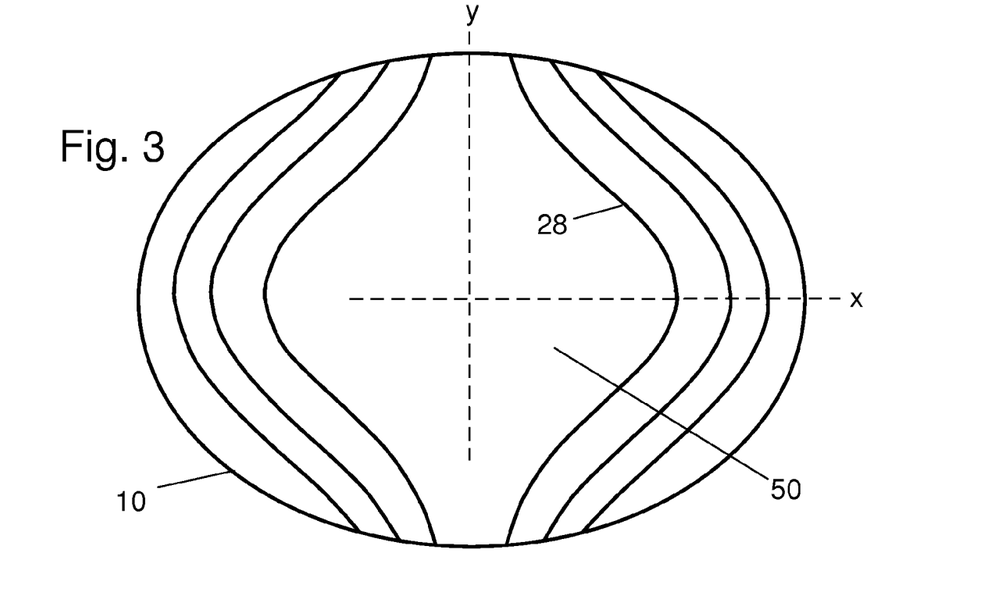
FIG. 3 is a rear view of the first lens element of the embodiment, with curves showing paths of zone boundaries.

The thickness of the first lens element is substantially given by the Alvarez equation:

$$t(n) = k\left(xy^2 + \frac{1}{3}x^3\right) + qx^2 + rxy + sy^2 + Dx + C(n)$$

where k is a constant and x and y are the rectangular coordinates (FIG. 3) on a plane perpendicular to the optical axis, of a given point within a first fresnel zone 30, the zeros of x and y being located at the optical axis at the center of the first lens element 10. D is the coefficient of a prismatic power in the x direction which is constant over the entire visual field. The thickness t(n) of the nth first Fresnel zone can be adjusted by a constant C(n) particular to that zone. The thickness may be measured relative to a reference surface of revolution, the surface types including ellipsoidal, spherical, and planar, etc. The constants q, r and s give the values of predetermined astigmatism and overall dioptric power corrections of the first lens element. When the astigmatism correction is zero, r=0, q=s, and q and s give the dioptric power correction.

For the first lens element 10, px(1) and py(1) are the x and y components of the prismatic powers of each first fresnel zone 30. They are proportional to the x and y partial derivatives of the above thickness formula and are given substantially by:

$$px(1)=kx^2+ky^2+2qx+ry+D;\ py(1)=2kxy+rx+2sy$$

The above equations for thickness and prismatic powers can be considered accurate since thin lens approximations are valid for eyeglass lenses.

Figure 1:
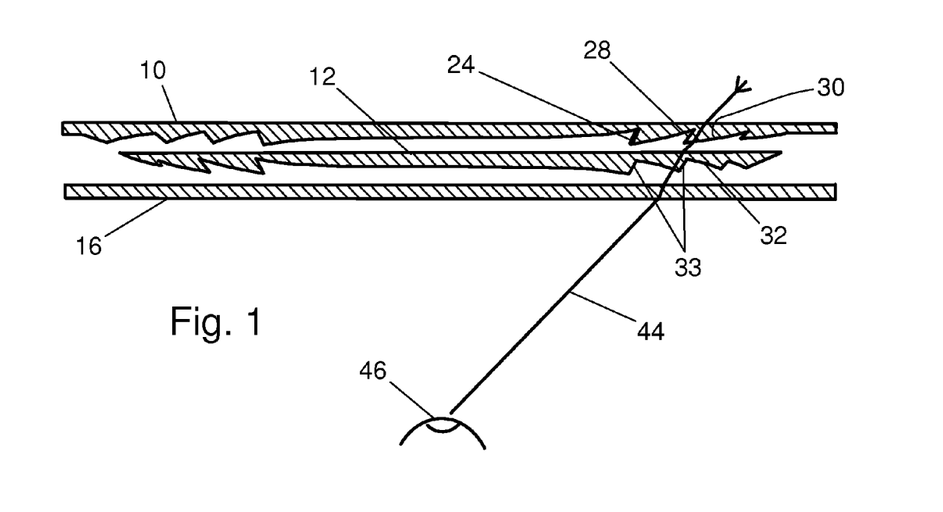
FIG. 1 is a top section view taken along the plane of line 1-1 of FIG. 4, of an embodiment of the present device, a variable focus lens system with the first and second lens elements and prescription lens, in zero-power position, the thicknesses, curvatures and slopes being exaggerated for clarity.
Figure 2:
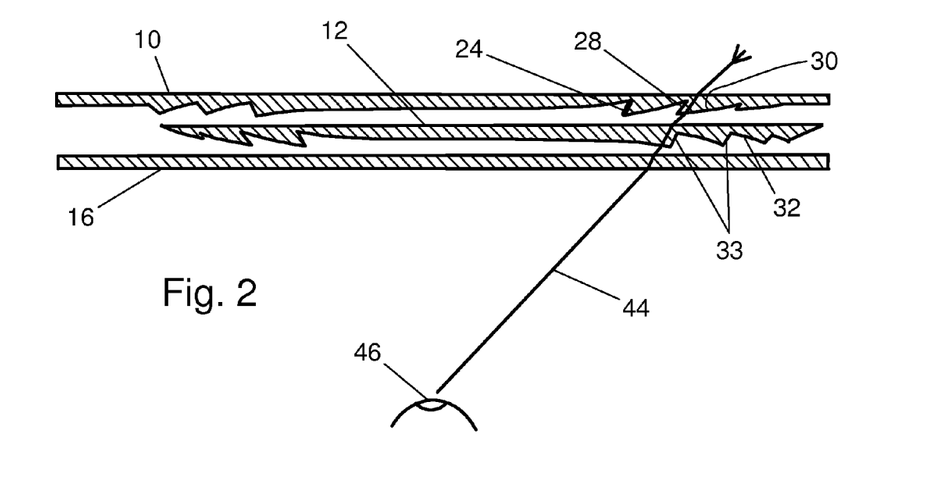
FIG. 2 is a top section view of the embodiment with the second lens element displaced, the thicknesses, curvatures and slopes being exaggerated for clarity.

A feature of the lens elements in the device, shown in FIGS. 1 and 2, is that each first zone boundary 28 and second zone boundary 33 has a slope or slant at every point which is optimized for that point on the boundary so as to present the smallest visual obstruction to the user's eye. That is, the surface of the zone boundary is made substantially parallel to the optical line of sight 44, which is the path of a light ray extending from the perceived object, grazing the specified zone boundary as it travels through the lens, and entering the user's eye 46. This feature can be well implemented on the fixed first lens element 10, greatly reducing scattering of light into the user's eye from reflection off the boundary, and also greatly reducing any perceived diffraction effects arising from the obstructions of the zone boundaries themselves. In conventional Fresnel lenses in which the zone boundaries are parallel to the optical axis, the resulting obstructions at substantially regular, closely spaced intervals may cause diffraction haloes perceived near bright objects. In the present device, the substantial reduction of this effect allows the use of zone boundaries which are much smaller and closer together, making them less noticeable in their effects. In addition, light scattering from refraction and reflection at the zone boundaries of the first and second lens elements can be further reduced by applying a thin layer of light-absorbing coating to the boundary itself. In FIGS. 1 and 2 is shown one zone boundary 24 with the light-absorbing coating applied.

In FIGS. 1 and 2, a slidable second lens element 12 is shown, with second Fresnel zones 32 and second zone boundaries 33 on one side, the lens having a substantially uniform thickness. The second lens element may taper to zero thickness at the edge. The second lens element 12 has an attached finger pad 14 and is made of a precision moldable material such as polycarbonate. The width and height of the second lens element may be less than those of the first lens element, to allow a horizontal range of motion. Its thickness may range from zero at the edge to 0.05 mm to 0.2 mm near the center. The edge can be made sharp to reduce visual obstruction and to improve the aesthetics of the lens. The edge sharpness is an additional advantage of employing the Fresnel concept with sloped boundaries for the second lens. The second lens element 12 may have a slight overall curvature or "dishing out" as in conventional eyeglass lenses, for improved rigidity. One or both sides of the second lens element 12 may have antireflection coating applied (not shown).

The fresnelized side of the first lens element, with first Fresnel zones, is directed towards the non-fresnelized side of the second lens element, to prevent contact between the zoned surfaces of the lenses and resulting damage. The second lens element 12 may be located approximately 0.05 mm to 0.3 mm from the first lens element 10. The array of zones and zone boundaries of the second element are similar to those of the first lens, except for the opposite sign of k in the thickness and power formulas, and independent values of other constants of the thickness equation. The zonal array allows control of the lens thickness for any zone of the lens, regardless of the curvature or slope at that zone and other points. One large central zone 50, which may extend to at least one fourth of the lens radius, can be provided on the first and second lens elements. The fresnelized side of the second lens element, with second Fresnel zones, is directed toward the prescription lens, for preventing damage due to contact.

The thickness of the second lens element 12 is substantially given by the Alvarez equation:

$$t(n) = -k\left(xy^2 + \frac{1}{3}x^3\right) + ux^2 + vxy + wy^2 + Ex + F(n)$$

where x and y are the rectangular coordinates (shown in FIG. 3), on a plane perpendicular to the optical axis, the zeros of x and y being located at the optical axis at the center of the first and second lens elements when the second lens element is in zero displacement (h=0) position. E is the coefficient of a prismatic power in the x direction which is constant over the entire visual field. In this equation, the thickness t(n) of the nth second Fresnel zone can be adjusted by a constant F(n) particular to that zone. The thickness may be measured relative to a reference surface of revolution, the surface types including ellipsoidal, spherical, and planar, etc. The constants u, v and w give the values of predetermined astigmatism and overall dioptric power corrections of the second lens element. When the astigmatism correction is zero, v=0, u=w, and u and w give the dioptric power correction.

When the second lens element 12 is displaced horizontally along the x axis (of the first lens element) a distance h by moving the finger pad 14, as shown in FIG. 2, a different combination of powers of the two lenses come into alignment.

px(2) and py(2) are the x and y components of the prismatic powers of each second Fresnel zone 32 of the second lens element. In the h=0 position they are given substantially by $$px(2)=-kx^2-ky^2+2ux+vy+E; \; py(2)=-2kxy+vx+2wy$$

The x and y components of prismatic powers of each second fresnel zone 32 when the second lens 12 is displaced by a length h, are given by $$px(2)=-k(x-h)^2-ky^2+2u(x-h)+vy+E; \; py(2)=-2k(x-h)y+v(x-h)+2wy$$

where the zeros of x and y are at the optical axis of the stationary first lens element 10.

In the special case of zero dioptric and astigmatism correction for the second lens element, and zero astigmatism correction for the first lens element, the total prismatic powers of each superimposed pair of lenses, with q=s and D, E, r, u, v, and w set to zero, are:

$$px(\text{total})=px(1)+px(2)=kx^2-k(x-h)^2+2qx=2kxh-kh^2+2qx$$

$$py(\text{total})=py(1)+py(2)=2kxy-2k(x-h)y+2qy=2kyh+2qy$$

The second term of px(total) is a constant over the entire lens that is dependent only on the position of the second lens element 12. It is independent of x and y, and is equivalent to an h-dependent prism which is constant over the visual field. This may be beneficial, since to some extent it can help to correct the system for parallax of vision for the left and right eyes. For both left and right hand lens systems of the eyeglasses, the sign of the constant k and of the displacement h can be chosen to give a convergence of vision for both eyes toward the perceived object when the dioptric power is adjusted for close focus.

The change in thickness at a zone boundary of the first and second lens elements can be made substantially constant along the boundary's entire length. One way of getting an equation describing the curved paths of the resulting zone boundaries is to set the thickness equal to a constant, and solve the thickness equation for y as a function of k, x, q, C and t: For the example of the first lens element with D=0 and zero astigmatism correction (r=0 and q=s), the thickness equation is solved for y as a function of t(n), C(n), q, x, and k, where the symbol z(n) is substituted for t(n)−C(n):

$$y = \pm \sqrt{\frac{z(n) - qx^2 - \frac{1}{3}x^3}{kx + q}}$$

Substituting various values for z(n) gives a family of curves describing the paths of the set of boundaries that result in a constant change in thickness along each boundary's entire length. For the second lens element, the values of the constants u, v, w, and F(n) would be assigned to q, r, s, and C(n) respectively in the above formula. For example, the boundaries for a lens element having a large central zone 50 having a thickness variation of 2 units, with six peripheral zones (three outer zones on each side) whose boundaries have steps in thickness of magnitude 1 unit, would require substitutions of values proportional to the following into the above formula:

$z(n)$ proportional to $-3, -2, -1, +1, +2, +3$

An example of a set of curves giving the locations of the resulting boundaries are shown in FIG. 3. For simplicity, the widths of the boundaries are not shown in the curves.

In the central region of the zoned sides of the first and second lens elements the values of px and py are small, therefore for maximum clarity of vision, one large central zone 50 can be made in this region. In this manner, the remaining zones can be 'crowded' onto the periphery of the lens where the curvatures are greater. The boundaries of these zones are less likely to obstruct the field of vision.

As was implemented in the first lens element 10, the second zone boundaries 33 of the second lens element 12 are given a slope or slant which is optimized for each boundary so as to present the smallest optical cross-sectional obstruction to the user's vision. The surface of the second zone boundary is made substantially parallel to the optical line of sight 44, which is the path of a light ray extending from the user's eye pupil to the specified second zone boundary 33, through the lens to the perceived object. For the slidable second lens element, the zone boundary slope or slant is predetermined so as to minimize the perceived cross-sectional obstruction, when averaged over the range of motion of the lens element.

The prescription lens 16, with or without Fresnel zones and boundaries, is superimposed on the first and second lens elements, as shown in FIG. 6. It can be attached to, or snapped onto, the frame 18. The prescription lens 16 can be customized to provide the wearer's distance and astigmatism correction. It is mounted either behind or in front of the first and second lens combination, the second lens element 12 being located between the first lens element 10 and the prescription lens 16. If the prescription lens 16 has Fresnel zones (possibly desirable if the required prescription power is large), the zones and their boundaries can be made according to the same principles as are employed in the first lens element 10. The prescription lens 16 has the second function of protecting the sides or surfaces of the first and second lens elements from dust, scratches and impacts. Either or both sides of the prescription lens 16 can have antireflection coating applied (not shown).

The first and second lens elements and the prescription lens may be tinted, or have variable light absorption dependent on the ambient illumination, such as that employed in photochromic lenses.

Light scattering from refraction and reflection from the first and second zone boundaries 28, 33 of the first and second lens elements and the prescription lens can be further reduced by applying an opaque coating 24 of light-absorbing material to the surfaces of the zone boundaries.

Figure 7:
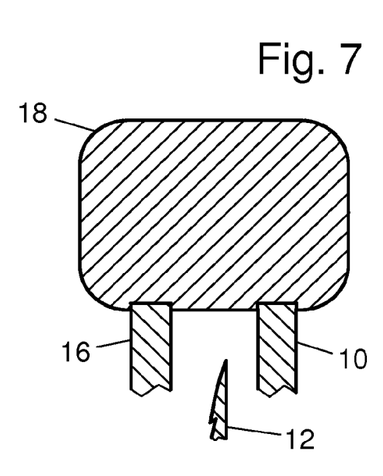
FIG. 7 is a section view of the embodiment, a frame with lenses, taken along the plane of lines 7-7 of FIG. 5.

FIG. 5 shows the first lens element 10, second lens elements 12, and prescription lens 16, with the finger pad 14, frame groove 38, and finger pad flange 34 for moving the second lens element. The spacings between lenses are exaggerated for clarity. In FIG. 6 is shown a section view of the frame 18 with attached first lens element 10 and prescription lens 16. The second lens element 12 is supported in the frame groove 38, and its motion is thereby restricted to horizontal movement. In FIG. 7 is shown a section view of the frame 18 with attached first lens element 10, prescription lens 16, and an edge of the second lens element 12.

One of the fixed lenses can be about 1 to 2 mm thick; the slidable second lens element 12 can be made much thinner, for example 0.05 mm to 0.2 mm. All three lenses can have an overall curvature or "dishing out" similar to that of conventional eyeglass lenses, for improved rigidity. This is accomplished for a given lens by giving one side of the lens a concave bias and the other side a convex bias. The thickness and power equations are left unaffected.

The focus adjusting finger pad 14 is attached to, or molded as an integral part of, the second lens element. The finger pad protrudes through a slot in the frame 18. The finger pad 14 enables the user to rapidly move the slidable second lens element 12 with a finger to adjust the focus of the lens system. The left and right-hand lens systems of the eyeglasses can be independently focused, having its own adjustment pad. There can be an optional link (not shown) across the bridge 48, such as a rod attached between the two finger pads (or left and right second lens elements), for simultaneous coordinated focus control. If it is desired that the motion of the finger pad 14 should closely follow the curved contour of the frame 18, then the finger pad can be split into two portions (not shown), the top portion of the finger pad functioning as a detached rider controlling the lower portion's motion.

Since some of the zone boundaries overlap adjacent areas of the Fresnelized lenses when viewed from a direction along the optical axis, the molding process used in their manufacture should include the precaution of separating the molding die from the molded lens at an oblique angle to prevent damage to the overlapping zone boundaries.

DESCRIPTION OF SECOND EMBODIMENT

Figure 8:
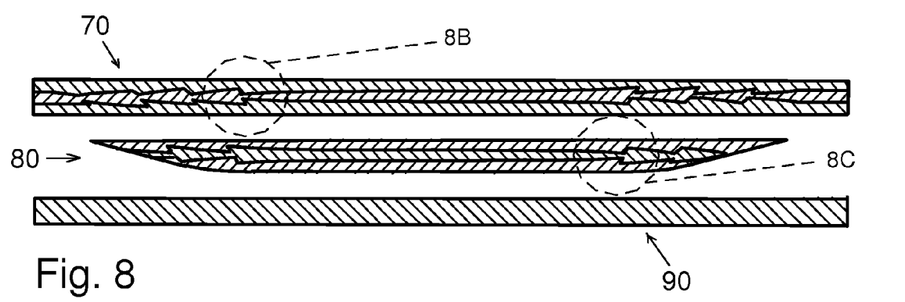
FIG. 8 is a top section view of a second embodiment, a lens system with first and second composite lens elements and prescription lens, in zero-displacement position, the thicknesses, curvatures and slopes being exaggerated for clarity.
Figure 8A:
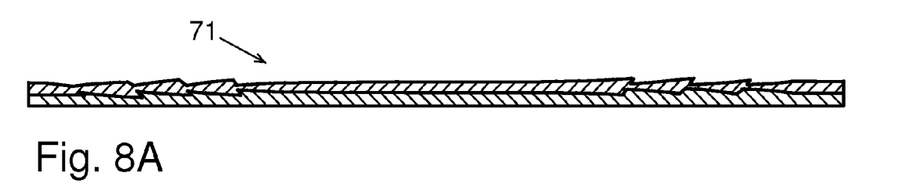
FIG. 8A is a top section view of the first lens assembly which is a part of the lens of FIG. 8.
Figure 8B:
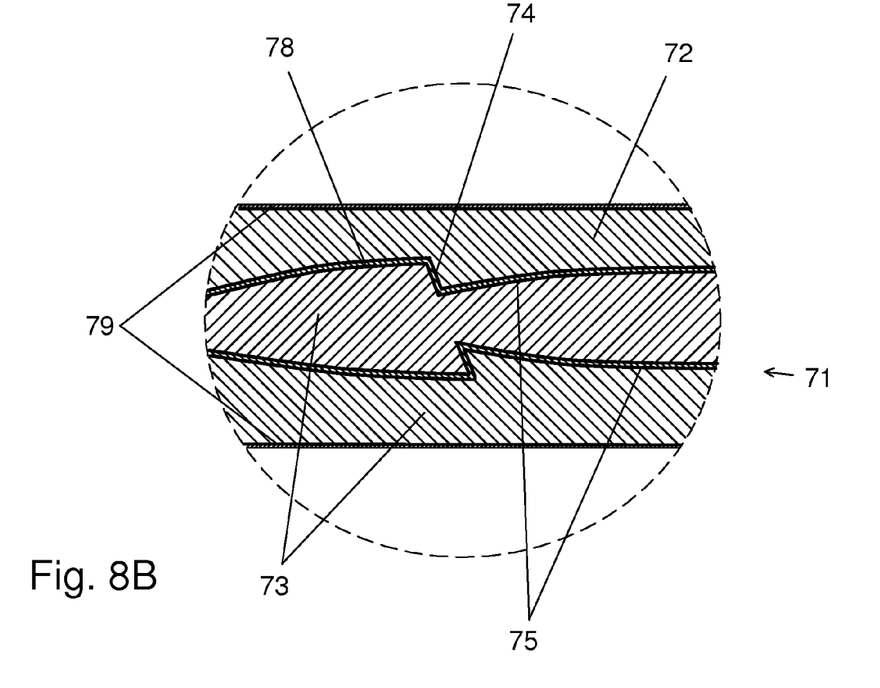
FIG. 8B is a magnified view of a part of FIG. 8, the thicknesses, curvatures and slopes being exaggerated for clarity.
Figure 8C:
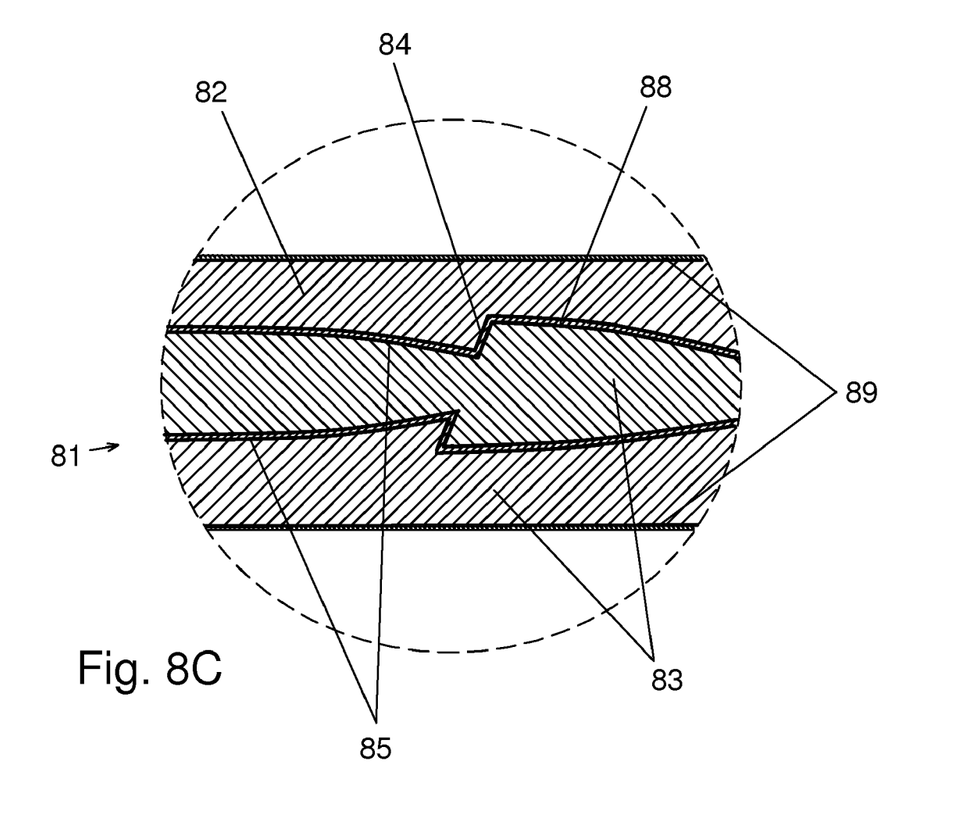
FIG. 8C is a magnified view of a part of FIG. 8, the thicknesses, curvatures and slopes being exaggerated for clarity.

In a second embodiment (FIGS. 8-8C), at least one first Fresnel lens component 73 is mated (joined perfectly with no gaps between the lenses) and bonded together, and the resulting first lens assembly 71 is mated and bonded to the fresnelized side of the first lens element 72. At least one second Fresnel lens component 83 is mated and bonded together, and the resulting second lens assembly 81 is mated and bonded to the fresnelized side of the second lens element 82. In FIGS. 8-8C, the example of two Fresnel lens components added to each of the first and second lens elements is shown.

The first lens element and attached first lens assembly constitute the first composite lens element 70. Adjoining lens components in the first composite lens element have different refractive indices, to enable refraction at the first internal Fresnel zones 75 at which are joined the individual lenses. The first internal Fresnel zones have first internal zone boundaries 74. The outer sides 79 (lens-air boundaries) of the first composite lens element 70 are smooth and non-fresnelized. The first lens assembly 71 is located between the first lens element and the second lens element.

The second lens element is treated similarly. At least one second Fresnel lens component 83 is mated and bonded together and the resulting second lens assembly 81 is mated and bonded to the fresnelized side of the second lens element 82. The second lens element and second lens assembly constitute the second composite lens element 80. Adjoining lens components in the second composite lens element have different refractive indices, to enable refraction at the second internal Fresnel zones 85. The second internal Fresnel zones have second internal zone boundaries 84. The outer sides 89 (lens-air boundaries) of the second composite lens element 80 are smooth and non-fresnelized. The second lens assembly is located between the second lens element and the prescription lens 90.

The second composite lens element 80 may be tapered at its edge, the edge having substantially zero thickness. The first and second composite lens elements are designed to simulate Alvarez lenses.

The prescription lens 90 may be constructed on the same principles as the first and second composite lens elements. The prescription lens may consist of several Fresnel lens components (not shown).

At least one side of each Fresnel lens component of the first and second composite lens elements and the prescription lens is divided into at least two internal fresnel zones and at least one internal zone boundary. The prismatic power formulas for the first and second lens elements of the first embodiment can also be applied to the first and second composite lens elements. As in the first embodiment, one large zone extending to at least one fourth of the lens radius can be made in the central regions of zoned sides of all the components of the first and second composite lens elements.

To reduce internal reflection, the first internal Fresnel zones 75 and first internal zone boundaries 74 may have first internal antireflection layers 78 applied between the Fresnel lens components and first lens element. The second internal Fresnel zones 85 and second internal zone boundaries 84 may have second internal antireflection layers 88 applied between the Fresnel lens components and second lens element. Each antireflection layer has refractive index intermediate to the indices of the lens components which it contacts. The outer sides (lens-air surfaces) of the first and second composite lens elements and the prescription lens may have antireflection coating 79, 89.

The mating of the Fresnel lens components in the composite lens elements may be accomplished by vacuum deposition of a transparent bonding material, which may serve as the internal antireflection layer, followed by joining, pressing and bonding of the two lenses, preferably in vacuum.

Since the difference in refractive index of any two adjacent Fresnel lens components in the first and second composite lens elements is relatively small compared to a lens-air index difference, the number of Fresnel lenses needed to provide adequate refractive power for the entire composite lens element will likely be at least approximately 5 to 7. The total required refractive power can be divided approximately equally between all of the fresnelized surfaces making up the composite lens element.

Each first and second internal zone boundary may have a slope or slant at every point which is optimized for that point on the boundary so as to present the smallest visual obstruction to the user's eye. The surface of the zone boundary is made substantially parallel to the optical line of sight.

It may be desired that the step size (internal zone boundary height) or change in thickness of a Fresnel lens component or lens element at an internal Fresnel boundary should be substantially constant along the boundary's entire length. To obtain the path curves of the internal zone boundaries, the same basic path formula as that for the first embodiment is used. For the first composite lens element, with D=0 and zero astigmatism correction (r=0 and q=s), the thickness equation is solved for y as a function of t(n), C(n), q, x, and k:

$$y = \pm\sqrt{\frac{z(n) - qx^2 - \frac{1}{3}x^3}{kx + q}}$$

For the second embodiment, the values of z(n), q, and k may have independent values for each fresnelized surface in the composite lens element.

By substituting various values for z(n), one arrives at a family of curves describing the paths of the set of internal zone boundaries that result in a constant change in zone-to-zone thickness along each boundary's entire length. An example of a set of curves giving locations of the resulting boundaries is shown in FIG. 3. As in the first embodiment, for the second composite lens element the values of u, v, w, and F(n) would be assigned to q, r, s, and C(n) respectively in the above formula.

The configuration of the second embodiment results in several performance characteristics of interest. First, since the outer sides or surfaces of the composite lens elements are smooth, there is reduced likelihood of damage from contact between composite lens elements or the prescription lens. Second, light scattering and reflection from the internal fresnel zones and boundaries can be greatly reduced by applying internal antireflection layers. Third, a greater range of dioptric power is possible, depending on the number of Fresnel lens components used in the composite lens elements.

CONCLUSION

Primarily, the device leads to less thickness of the lenses than previous versions of the slidable lens concept. A wide range of adjustable power, of about 4 to 5 diopters, is available with the present device, and the power is manually adjustable with great rapidity, on the order of 1 second. Since the optical obstruction produced by zone boundaries is reduced, the related diffraction effects are greatly diminished, making possible lenses with a large number of zones near the lens edges, each zone boundary being much smaller and less noticeable. The present device is lighter (approximately 30 grams or less), comfortable for extended wear, substantially less complex, thinner and less obtrusive than previous devices, thus is preferred on aesthetic grounds. It is also less costly, since the lens elements can be molded by mass production by a process similar to that used for making compact discs. For the wearer's safety the device can be made of shatterproof materials such as polycarbonate.

The device is not limited to the embodiments herein set forth. Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

The invention claimed is:

1. A variable focus lens system for use in eyeglasses, comprising:
   (a) a first lens element, fixed to a frame, one side of said first lens element being divided into a plurality of first fresnel zones and at least one first zone boundary of the first fresnel zones;

(b) a second lens element, superimposed in tandem on said first lens element along the optical axis of the system, said second lens element being relatively slidable in a direction normal to the optical axis of the lens system, one side of said second lens element being divided into a plurality of second fresnel zones and at least one second zone boundary of the second fresnel zones;

(c) a prescription lens, for providing user's distance and astigmatism correction, and for protecting the first and second lens elements from dust and impacts, the prescription lens being superimposed on said first and second lens elements, the second lens element being medial the first lens element and the prescription lens;

(d) said one side of said first lens element, having a plurality of first fresnel zones and at least one first zone boundary, being directed toward the second lens element;

(e) said one side of said second lens element, having a plurality of second fresnel zones and at least one second zone boundary, being directed toward the prescription lens; and (f) means for moving said second lens element relative to said first lens element in a direction normal to the optical axis of the lens system.

2. The variable focus lens system as recited in claim 1, wherein:

(a) each of the first fresnel zones of the first lens element has prismatic powers, in the x and y directions, substantially equal to $$px(1)=kx^2+ky^2+2qx+ry+D; \ py(1)=2kxy+rx+2sy$$

wherein x and y are rectangular coordinates on a plane perpendicular to the optical axis of the lens system, centered on the optical axis, k is a constant representing the rate of variation of lens dioptric power in the x direction, D is a constant representing the coefficient of a prismatic power which is constant over the field of view, and q, r, and s are predetermined astigmatism and dioptric power constants; and (b) each of the second fresnel zones of the second lens element having prismatic powers, in the x and y directions, substantially equal to $$px(2)=-kx^2-ky^2+2ux+vy+E; \ py(2)=-2kxy+vx+2wy$$

wherein E is a constant representing the coefficient of a prismatic power which is constant over the field of view, and u, v, and w are predetermined astigmatism and dioptric power constants.

3. The variable focus lens system as recited in claim 2, wherein one of the first fresnel zones in the first lens element and one of the second fresnel zones in the second lens element occupy at least all of one side of the lens element within a distance from the optical axis equal to one fourth of the minimum radius of the lens element, measured from the optical axis of the lens element, whereby obstruction in the central visual field is reduced.

4. The variable focus lens system as recited in claim 2, wherein the path of at least one first and second zone boundary of each of the first and second lens elements follows a curve which substantially equalizes the change in thickness at the at least one first and second zone boundary along the entire length of the at least one first and second zone boundary.

5. The variable focus lens system as recited in claim 4, wherein the first and second lens elements and the prescription lens have antireflection coating.

6. The variable focus lens system as recited in claim 4, further comprising a light absorbing coating, applied to the at least one first and second zone boundary of the first and second lens elements, for reducing light scattering.

7. The variable focus lens system as recited in claim 6, wherein the first and second lens elements and the prescription lens have antireflection coating.

8. The variable focus lens system as recited in claim 2, further comprising a light absorbing coating, applied to the at least one first and second zone boundary of the first and second lens elements, for reducing light scattering.

9. The variable focus lens system as recited in claim 8, wherein the first and second lens elements and the prescription lens have antireflection coating.

10. The variable focus lens system as recited in claim 2, wherein the first and second lens elements and the prescription lens have antireflection coating.

11. The variable focus lens system as recited in claim 1, further comprising (a) a first lens assembly, comprising at least one first fresnel lens component mated and bonded together, said first lens assembly being mated and bonded to the first lens element, said first lens assembly being medial the first lens element and the second lens element, a first composite lens element comprising the first lens element and said first lens assembly, for simulating an alvarez lens element, at least one side of each first fresnel lens component being divided into a plurality of first internal fresnel zones and at least one first internal zone boundary of said first internal fresnel zones, said first composite lens element having prismatic powers, in the x and y directions, substantially equal to $$px(1)=kx^2+ky^2+2qx+ry+D; \ py(1)=2kxy+rx+2sy$$

wherein x and y are rectangular coordinates on a plane perpendicular to the optical axis of the lens system, centered on the optical axis, k is a constant representing the rate of variation of first composite lens element dioptric power in the x direction, D is a constant representing the coefficient of a prismatic power which is constant over the field of view, and q, r, and s are predetermined astigmatism and dioptric power constants;

(b) a second lens assembly, comprising at least one second fresnel lens component mated and bonded together, said second lens assembly being mated and bonded to the second lens element, said second lens assembly being medial the second lens element and the prescription lens, a second composite lens element comprising the second lens element and said second lens assembly, for simulating an alvarez lens element, at least one side of each second fresnel lens component being divided into a plurality of second internal fresnel zones and at least one second internal zone boundary of said second internal fresnel zones, said second composite lens element having prismatic powers, in the x and y directions, substantially equal to $$px(2)=-kx^2-ky^2+2ux+vy+E; \ py(2)=-2kxy+vx+2wy$$

wherein E is a constant representing the coefficient of a prismatic power which is constant over the field of view, and u, v, and w are predetermined astigmatism and dioptric power constants.

12. The variable focus lens system as recited in claim 11, wherein at least one of the first and second internal fresnel zones in each of the first and second composite lens elements occupies at least all of the area of the lens element within a distance from the optical axis equal to one fourth of the minimum radius of the composite lens element, measured from the optical axis of the lens element, whereby obstruction in the central visual field is reduced.

13. The variable focus lens system as recited in claim 11, wherein the path of at least one first and second internal zone boundary follows a curve substantially equalizing the height of the at least one first and second internal zone boundary along the entire length of the internal zone boundary.

14. The variable focus lens system as recited in claim 13, wherein the first and second composite lens elements and the prescription lens have antireflection coating.

15. The variable focus lens system as recited in claim 13, further comprising at least one first internal antireflection layer applied to the first internal fresnel zones and the at least one first internal zone boundary, and at least one second internal antireflection layer applied to the second internal fresnel zones and the at least one second internal zone boundary.

16. The variable focus lens system as recited in claim 15, wherein the first and second composite lens elements and the prescription lens have antireflection coating.

17. The variable focus lens system as recited in claim 11, further comprising at least one first internal antireflection layer applied to the first internal fresnel zones and the at least one first internal zone boundary, and at least one second internal antireflection layer applied to the second internal fresnel zones and the at least one second internal zone boundary.

18. The variable focus lens system as recited in claim 17, wherein the first and second composite lens elements and the prescription lens have antireflection coating.

19. The variable focus lens system as recited in claim 11, wherein the first and second composite lens elements and the prescription lens have antireflection coating.

* * * * *